(12) United States Patent
Mikoshiba et al.

(10) Patent No.: US 6,458,194 B1
(45) Date of Patent: Oct. 1, 2002

(54) AZO DYE COMPOUND HAVING 1,2,4-TRIAZOLE AS THE AZO COMPONENT

(75) Inventors: Hisashi Mikoshiba, Minami-ashigara; Takayoshi Kamio, Tokyo, both of (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 102 days.

(21) Appl. No.: 09/676,226

(22) Filed: Sep. 29, 2000

(30) Foreign Application Priority Data

Sep. 29, 1999 (JP) ............................................ 11-275697

(51) Int. Cl.[7] ...................... C09D 11/00; C09B 29/033
(52) U.S. Cl. ...................... 106/31.5; 534/752; 8/690; 8/691
(58) Field of Search ..................... 106/31.5; 534/752; 8/690, 691

(56) References Cited

U.S. PATENT DOCUMENTS

| | | | | |
|---|---|---|---|---|
| 3,221,005 A | * | 11/1965 | Moore et al. | 534/565 |
| 3,392,164 A | * | 7/1968 | Wunderlich | 534/582 |
| 3,829,411 A | * | 8/1974 | Coates, Jr. et al. | 534/733 |
| 4,621,046 A | * | 11/1986 | Sato et al. | 430/381 |
| 4,885,272 A | * | 12/1989 | Chapman et al. | 428/195 |
| 5,091,517 A | * | 2/1992 | Naef | 534/728 |
| 5,110,941 A | * | 5/1992 | Taniguchi et al. | 534/752 |
| 5,580,964 A | * | 12/1996 | Berneth et al. | 106/31.48 |
| 5,952,475 A | * | 9/1999 | Berneth | 106/31.5 |
| 6,235,096 B1 | * | 5/2001 | Meyrick et al. | 106/31.43 |

FOREIGN PATENT DOCUMENTS

JP  01275187 A  * 11/1989 .......... B41M/05/26

* cited by examiner

Primary Examiner—Helene Klemanski
(74) Attorney, Agent, or Firm—Burns, Doane, Swecker & Mathis, LLP

(57) ABSTRACT

A dye compound excellent in transfer property and color fastness against light, a yellow dye excellent in light absorption property, a yellow dye compound for thermal transfer dye donating material excellent in solubility and a dye compound which can be synthesized with ease from readily-available source materials are provided. A dye compound of the present invention is expressed by the general formula (1):

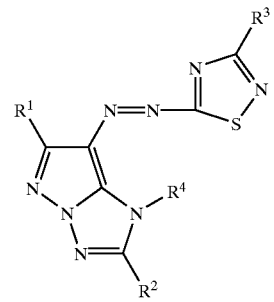

or a salt thereof, wherein
$R^1$, $R^2$, $R^3$ and $R^4$ independently represent a hydrogen atom or a substituent.

8 Claims, 1 Drawing Sheet

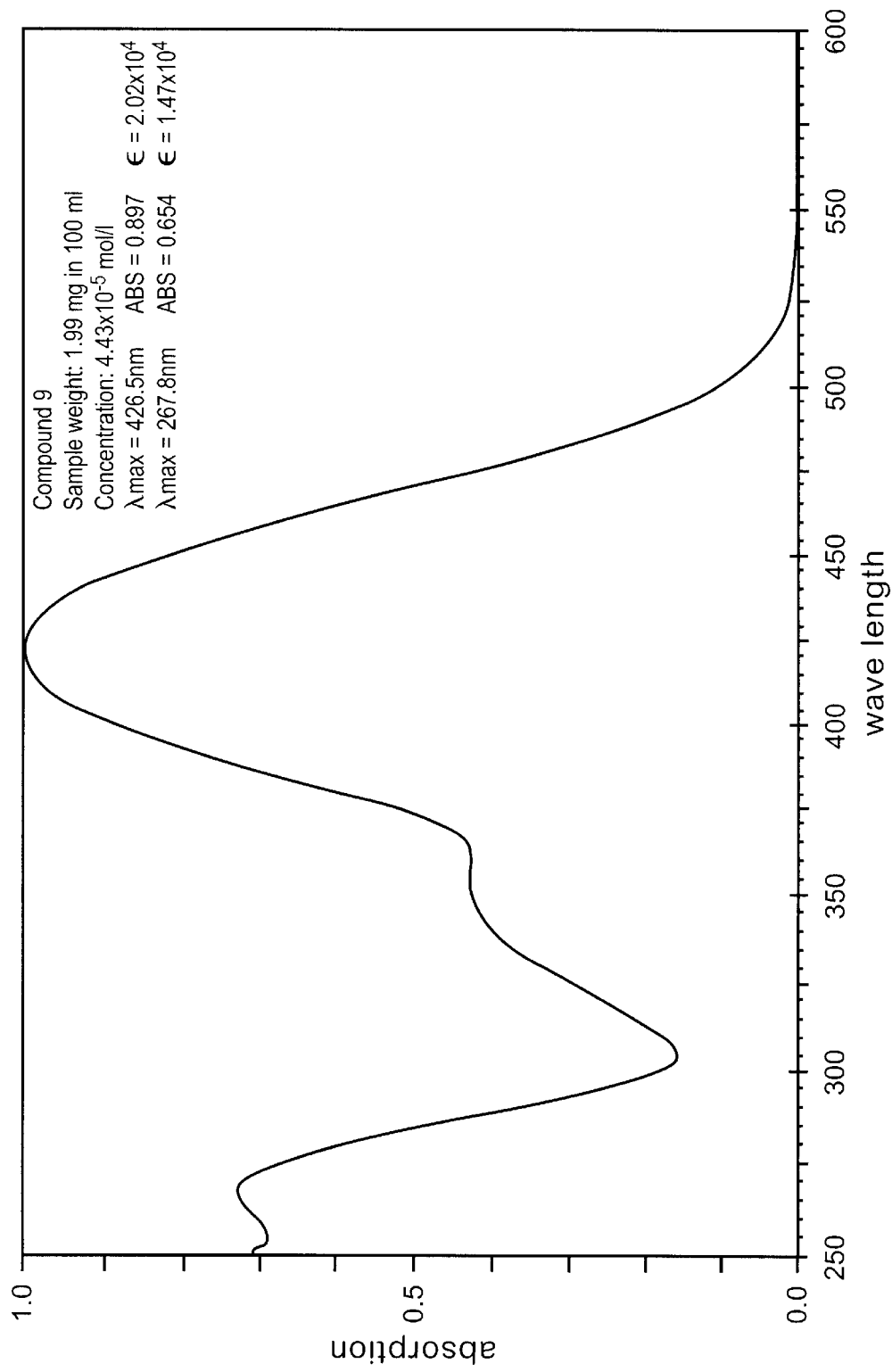

AZO DYE COMPOUND HAVING 1,2,4-TRIAZOLE AS THE AZO COMPONENT

BACKGROUND OF THE INVENTION

1. Field of the Invention

The present invention relates to a dye compound excellent in hue, and in color fastness against light, moisture and heat; and more specifically to a dye compounds in particular as a yellow dye, preferably used for full-color image producing system such as ink-jet system, direct digital thermal transfer system or fused thermal transfer system.

2. Description of Related Art

Azo dye is a kind of dye obtained by azo coupling of a so-called coupler component and a diazonium salt (so-called diazo component); in which the coupler component is such as an active hydrogen-containing compound, phenols or p-dialkylaminobenzenes; and the diazonium salt is derived from aminoaryl compound or aminohetero-aromatic compound. Azo dye holds a representative position in the field of dyes, since it is affordable of a wide variety of color tones by virtue of wide selection of the coupler and azo components. Among these, there are known popular yellow dyes such as of pyridone azo-base, aminopyrazole azo-base, pyrazolone azo-base and active methylene azo-base.

In recent years researches are extensively carried on in the fields of color photograph, color electronic photograph, ink-jet system, direct digital thermal transfer system (DDTT), fused thermal transfer system, printing ink and silver photograph based on the diffusion transfer system, in which the azo dye is applied as an image producing dye. The azo dye is also becoming a major issue of investigation as a filter dye in the field of electronics, since demands for filters for solid-state image pickup tube and color liquid crystal television set increases There are a variety of proposed yellow dyes for use in ink-jet color copying machine, direct digital thermal transfer (DDTT) proofer, and fused thermal transfer proofer. In particular, a pyrazolotriazole-base azo dye disclosed in JP-A-1-275187 (the code "JP-A-" as used herein means an "unexamined published Japanese patent application") is preferable for its sharp absorption waveform and relatively high color fastness against light. The color fastness against light is, however, not fully satisfiable yet and is still on the way to further improvement. On the other hand, JP-A-2-24191 discloses 1,2,4-thiadiazolyl azo dye, wherein the coupler of which consists of aminopyrazole or pyrazolo[5,1-c]triazole.

There is also well-known color diffusion transfer photographic method using an azo dye image producing compound which can release an azo dye differing in the diffusivity from the image producing compound per se under a basic development condition. The image producing compound used in such method suffers from a low transfer property and poor color fastness of an obtained image, so that the improvement thereof has been desired.

SUMMARY OF THE INVENTION

It is therefore an object of the present invention to solve the foregoing problems in the prior art.

That is, the present invention is to provide a dye compound excellent in transfer property and color fastness against light. It is another object of the present invention to provide a yellow dye compound excellent in light absorption property, It is again another object of the present invention to provide a yellow dye compound for thermal transfer dye donating material excellent in solubility. It is still another object of the present invention to provide a dye compound which can be synthesized with ease from readily-available source materials.

The present inventors found out from our extensive investigations on the azo component of pyrazolo[1,5-b] triazole azo dyes that those having 1,2,4-triazole as the azo component were preferable since they were particularly high in the color fastness against light, and such finding led us to complete the present invention.

While the compound of the present invention is a structural isomer of the dye disclosed JP-A-2-24191 or JP-A-1-275187, the compound of the present invention was found to exhibit an excellent solubility beyond our expectation when made into an ink and to show a good yield in the synthesis.

That is, the present invention is to provide a dye compound expressed by the general formula (1):

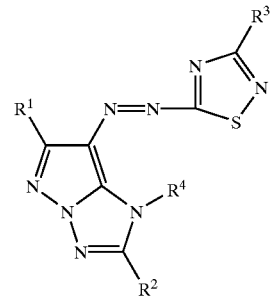

or a salt thereof, wherein $R^1$, $R^2$, $R^3$ and $R^4$ independently represent a hydrogen atom or a substituent.

More preferably, $R^1$, $R^2$, $R^3$ and $R^4$ of the general formula (1) are independently any of the substituents selected from the group comprising hydrogen atom, halogen atom, aliphatic group, aryl group, heterocyclic group, cyano group, hydroxyl group, nitro group, carboxyl group, alkoxy group, aryloxy group, silyloxy group, heterocyclic oxy group, acyloxy group, carbamoyloxy group, alkoxycarbonyloxy group, aryloxycarbonyloxy group, amino group (including anilino group), acylamino group, aminocarbonylamino group, alkoxycarbonylamino group, aryloxycarbonylamino group, sulfamoylamino group, alkyl and arylsulfonylamino groups, alkylthio group, arylthio group, heterocyclic thio group, sulfamoyl group, sulfo group, alkyl and arylsulfinyl group, alkyl and arylsulfenyl groups, alkyl and arylsulfonyl groups, acyl group, aryloxycarbonyl group, alkoxycarbonyl group, carbamoyl group, azo group, imide group and phosphoryl group.

Still more preferably, $R^1$ of the general formula (1) is any one of alkyl group, aryl group, acylamino group, heterocyclic group or alkoxy group: $R^2$ is either of alkyl group or aryl group; $R^3$ is any one of hydrogen atom, halogen atom, cyano group, aliphatic group, alkylthio group, alkylsulfonyl group, alkylsulfinyl group, alkoxycarbonyl group, carbamoyl group, alkoxy group, arylthio group, arylsulfonyl group, arylsulfinyl group, aryloxy group or aryl group; and $R^4$ is any one of hydrogen atom, aliphatic group or aryl group.

Other aspects of the present invention are to provide a filter, an ink sheet, a thermal transfer dye donating material and an ink composition containing the compound expressed by the general formula (1) or a salt thereof.

DESCRIPTION OF THE PREFERRED EMBODIMENTS

Mode of implementation and embodiment of the present invention will be detailed hereinafter.

The compound of the present invention is characterized in that being expressed by the general formula (1).

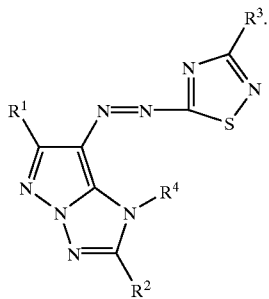

In the formula, $R^1$, $R^2$, $R^3$ and $R^4$ independently represent a hydrogen atom or a substituent.

Specific examples of the substituent represented by $R^1$, $R^2$, $R^3$ or $R^4$ include halogen atom, aliphatic group, aryl group, heterocyclic group, cyano group, hydroxyl group, nitro group, carboxyl group, alkoxy group, aryloxy group, silyloxy group, heterocyclic oxy group, acyloxy group, carbamoyloxy group, alkoxycarbonyloxy group, aryloxycarbonyloxy group, amino group (including anilino group), acylamino group, aminocarbonylamino group, alkoxycarbonylamino group, aryloxycarbonylamino group, sulfamoylamino group, alkyl and arylsulfonylamino groups, alkylthio group, arylthio group, heterocyclic thio group, sulfamoyl group, sulfo group, alkyl and arylsulfinyl groups, alkyl and arylsulfenyl groups, alkyl and arylsulfonyl groups, acyl group, aryloxycarbonyl group, alkoxycarbonyl group, carbamoyl group, azo group, imide group and phosphoryl group, while being not limited thereto.

More preferably, $R^1$, $R^2$ and $R^3$ independently represent hydrogen atom; halogen atom (e.g., chlorine atom, bromine atom, iodine atom); aliphatic group [straight-chained or branched substituted or unsubstituted alkyl group (preferably alkyl group having 1 to 30 carbon atoms, and specifically methyl, ethyl, n-propyl, isopropyl, t-butyl, n-octyl, eicosyl, 2-chloroethyl, 2-cyanoethyl and 2-ethylhexyl groups), substituted or unsubstituted alkenyl group (preferably substituted or unsubstituted alkenyl group having 2 to 30 carbon atoms, and specifically allyl, prenyl, geranyl and oleyl groups), substituted or unsubstituted alkynyl group (preferably substituted or unsubstituted alkynyl group having 2 to 30 carbon atoms, and specifically ethynyl and propargyl groups), substituted or unsubstituted cycloalkyl group (preferably substituted or unsubstituted cycloalkyl group having 5 to 7 carbon atoms, and specifically cyclohexyl and cyclopentyl groups)]; aryl group (preferably substituted or unsubstituted aryl group having 6 to 30 carbon atoms, and specifically phenyl, p-tolyl, naphthyl, m-chlorophenyl and o-hexadecanoylaminophenyl); heterocyclic group (preferably five- or six-membered, substituted or unsubstituted, aromatic or non-aromatic heterocyclic group, and more preferably five- or six-membered aromatic heterocyclic group, such as 2-furyl, 2-thienyl, 2-pyrimidinyl and 2-benzothiazolyl); cyano group; hydroxyl group; nitro group; carboxyl group; alkoxy group (preferably substituted or unsubstituted alkoxy group having 1 to 30 carbon atoms, and specifically methoxy, ethoxy, isopropoxy, t-butoxy, n-octyloxy and 2-methoxyethoxy groups); aryloxy group (preferably substituted or unsubstituted aryloxy group having 6 to 30 carbon atoms, and specifically phenoxy, 2-methylphenoxy, 4-t-butylphenoxy, 3-nitrophenoxy and 2-tetradecanoylaminophenoxy groups); silyloxy group (preferably those having 3 to 20 carbon atoms, and specifically trimethylsilyloxy and t-butyldimethylsilyloxy groups); heterocyclic oxy group (preferably substituted or unsubstituted heterocyclic oxy group having 2 to 20 carbon atoms, and specifically 1-phenyltetrazole-5-oxy and 2-tetrahydropyranyloxy groups); acyloxy group (preferably substituted or unsubstituted acyloxy group having 2 to 30 carbon atoms, and specifically formyloxy, acetyloxy, pivaloyloxy and stearoyloxy groups); carbamoyloxy group (preferably substituted or unsubstituted carbamoyloxy group having 1 to 30 carbon atoms, and specifically damethylcarbamoyloxy, diethylcarbamoyloxy, morpholinocarbamoyloxy and di-n-octylaminocarbonyloxy groups); alkoxycarbonyloxy group (preferably substituted or unsubstituted alkoxycarbonyloxy group having 2 to 30 carbon atoms, and specifically methoxycarbonyloxy, ethoxycarbonyloxy, t-butoxycarbonyloxy and n-octylcarbonyloxy groups); aryloxycarbonyloxy group (preferably substituted or unsubstituted aryloxycarbonyloxy group having 7 to 30 carbon atoms, and specifically phenoxycarbonyloxy, p-methoxyphenoxycarbonyloxy and p-n-hexadecyloxyphenoxycarbonyloxy groups); amino group (including anilino group, preferably substituted or unsubstituted alkylamino group having 1 to 30 carbon atoms, and substituted or unsubstituted anilino group having 6 to 30 carbon atoms, and specifically amino, methylamino, dimethylamino, anilino, N-methyl-anilino and diphenylamino groups); acylamino group (preferably substituted or unsubstituted acylamino group having 2 to 30 carbon atoms, and specifically formylamino, acetylamino, pivaloylamino and lauroylamino groups); aminocarbonylamino group (preferably substituted or unsubstituted aminocarbonylamino group having 1 to 30 carbon atoms, and specifically carbamoylamino, dimethylaminocarbonylamino, diethylaminocarbonylamino and morpholinocarbonylamino groups); alkoxycarbonylamino group (preferably substituted or unsubstituted alkoxycarbonylamino group having 2 to 30 carbon atoms, and specifically methoxycarbonylamino, ethoxycarbonylamino, t-butoxycarbonylamino, n-octadecyloxycarbonylamino and N-methyl-methoxycarbonylamino groups); aryloxycarbonylamino group (preferably substituted or unsubstituted aryloxycarbonylamino group having 7 to 30 carbon atoms, and specifically phenoxycarbonylamino, p-chlorophenylcarbonylamino and m-n-octyloxycarbonylamino groups); sulfamoylamino group (preferably substituted or unsubstituted sulfamoylamino group having 0 to 30 carbon atoms, and specifically sulfamoylamino, dimethylaminosulfonylamino and n-octylaminosulfonylamino groups); alkyl and arylsulfonylamino groups [preferably substituted or unsubstituted alkylsulfonylamino group having 1 to 30 carbon atoms (e.g., methanesulfonylamino and butanesulfonylamino groups), or preferably substituted or unsubstituted arylsulfonylamino group having 6 to 30 carbon atoms (e.g., phenylsulfonylamino (benzenesulfonylamino) and toluenesulfonylamino (p-methylphenylsulfonylamino) groups)]; alkylthio group (preferably substituted or unsubstituted alkylthio group having 1 to 30 carbon atoms, and specifically methylthio, ethylthio and n-hexadecylthio groups); arylthio group (preferably substituted or unsubstituted arylthio group having 6 to 30 carbon atoms, and specifically phenylthio, tolylthio and m-methoxyphenylthio groups); heterocyclic thio group (preferably substituted or unsubstituted heterocyclic thio group having 3 to 30 carbon atoms, and specifically 2-benzothiazolylthio and 2,4-diphenoxy-1,3,5 triazole- 6-thio groups); sulfamoyl group (preferably substituted or unsubstituted sulfamoyl group having 0 to 30 carbon atoms, and specifically N-ethylsulfamoyl, N-(2-dodecyloxyethyl) sulfamoyl and N,N-dimethylsulfamoyl groups); sulfo group, alkyl and arylsulfinyl groups; alkyl and arylsulfenyl groups; alkyl and arylsulfonyl groups [preferably substituted or unsubstituted alkylsulfonyl group having 1 to 30 carbon atoms (e.g., methanesulfonyl and ethanesulfonyl groups), or preferably substituted or unsubstituted arylsulfonyl group having 6 to 30 carbon atoms (e.g., benzenesulfonyl and toluenesulfonyl groups)]; acyl group [preferably substituted or unsubstituted alkylcarbonyl group having 1 to 30 carbon atoms (e.g., acetyl, pivaloyl, 2-chloroacetyl and stearoyl groups), or preferably substituted or unsubstituted arylcarbonyl group having 7 to 30 carbon atoms (e.g., benzoyl and p-n-octyloxyphenylcarbonyl groups)]; aryloxycarbonyl group (preferably substituted or unsubstituted aryloxycarbonyl group having 7 to 30 carbon atoms, and specifically phenoxycarbonyl, o-chlorophenoxycarbonyl, m-nitrophenoxycarbonyl and p-t-butylphenoxycarbonyl groups); alkoxycarbonyl group (preferably substituted or unsubstituted alkoxycarbonyl group having 2 to 30 carbon atoms, and specifically methoxycarbonyl, ethoxycarbonyl, t-butoxycarbonyl and n-octadecyloxycarbonyl groups); carbamoyl group (preferably substituted or unsubstituted carbamoyl group having 1 to 30 carbon atoms, and specifically aminocarbonyl, N-methylaminocarbonyl, N,N-dimethylaminocarbonyl and N,N-di-n-octylaminocarbonyl groups); azo group [preferably substituted or unsubstituted arylazo group having 6 to 30 carbon atoms (e.g., phenylazo and p-chlorophenylazo groups); or preferably substituted or unsubstituted heterocyclic azo group having 6 to 30 carbon atoms (e g., 5-ethylthio-1,3,4thiadiazole-2-yl azo group)]; imide group (preferably N-succinimide and N-phthalimide); or phosphoryl group (preferably substituted or unsubstituted phosphoryl group having 2 to 30 carbon atoms, and specifically phenoxyphosphoryl and octyloxyphosphoryl groups).

$R^1$ is preferably an alkyl group (substituted or unsubstituted alkyl group having 1 to 20 carbon atoms, and specifically methyl, ethyl, isopropyl, t-butyl, n-octyl and 2-methoxyethyl groups); aryl group (substituted or unsubstituted aryl group having 6 to 20 carbon atoms, and specifically phenyl, o-chlorophenyl, m-methoxyphenyl, p-acetylaminophenyl and naphthyl groups); acylamino group (substituted or unsubstituted acylamino group having 1 to 20 carbon atoms, and specifically acetylamino, pivaloylamino and benzoylamino groups); heterocyclic group (substituted or unsubstituted heterocyclic group having 2 to 30 carbon atoms, and specifically 2-furyl, 1-pyridyl and 3-pyridyl groups); or alkoxy group (substituted or unsubstituted alkoxy group having 1 to 20 carbon atoms, and specifically methoxy, ethoxy and 2-methoxyethoxy groups).

$R^1$ is more preferably an unsubstituted alkyl group having 1 to 6 carbon atoms or aryl group; still more preferably a secondary or tertiary unsubstituted alkyl group, phenyl group or chlorophenyl group; and most preferably a t-butyl, isopropyl, phenyl or chlorophenyl group.

$R^2$ is preferably an alkyl group (substituted or unsubstituted alkyl group having 1 to 30 carbon atoms, and specifically methyl, ethyl, isopropyl, t-butyl and n-octyl groups); or aryl group (substituted or unsubstituted aryl group having 6 to 20 carbon atoms, and specifically phenyl, o-chlorophenyl and m-methoxyphenyl groups). $R^2$ is more preferably a substituted or unsubstituted alkyl group, still more preferably an unsubstituted alkyl group having 1 to 8 carbon atoms, and most preferably an isopropyl group.

$R^3$ is preferably a hydrogen atom; halogen atom; cyano group; substituted or unsubstituted aliphatic group having 1 to 30 carbon atoms; substituted or unsubstituted alkylthio group having 1 to 30 carbon atoms ; substituted or unsubstituted alkylsulfonyl group having 1 to 30 carbon atoms; substituted or unsubstituted alkylsulfinyl group having 1 to 30 carbon atoms; substituted or unsubstituted alkoxycarbonyl group having 2 to 30 carbon atoms; substituted or unsubstituted carbamoyl group having 1 to 30 carbon atoms; substituted or unsubstituted alkoxy group having 1 to 30 carbon atoms; substituted or unsubstituted arylthio group having 6 to 30 carbon atoms; substituted or unsubstituted arylsulfonyl group having 6 to 30 carbon atoms; substituted or unsubstituted arylsulfinyl group having 6 to 30 carbon atoms; substituted or unsubstituted aryloxy group having 6 to 30 carbon atoms; or substituted or unsubstituted aryl group having 6 to 30 carbon atoms.

$R^3$ is more preferably an alkylthio group, aryl group or alkylsulfonyl group.

$R^4$ is preferably a hydrogen atom, aliphatic group (substituted or unsubstituted alkyl group having 1 to 30 carbon atoms such as methyl, ethyl, isopropyl and t-butyl groups; or substituted or unsubstituted cycloalkyl group having 5 to 30 carbon atoms such as cyclohexyl and cyclopentyl groups); or aryl group (substituted or unsubstituted aryl group having 1 to 30 carbon atoms such as phenyl and naphthyl groups). $R^4$ is more preferably a hydrogen atom.

The compound of the present invention may also have in the structure thereof an atomic group exhibiting a suppressive effect on color fading. For the case that color fastness of the image is critical, introducing such atomic group having the fading-suppressive effect is in particular desirable. The fading-suppressive atomic group may be bound at any position of $R^1$, $R^2$, $R^3$ or $R^4$ of the general formula (1). The Preferable examples of the fading-suppressive atomic group are disclosed in JP-A-3-205189.

The compound of the present invention expressed by the general formula (1) may sometimes form an acid adduct salt depending on types of the substituents. Possible acid adduct salts include mineral acid salts such as hydrochloride, hydrobromide, nitride, sulfate and phosphate; and organic acid salts such as p-toluenesulfonate, methanesulfonate, oxalate, tartrate, malate and citrate. Base addict salts may also be produced depending on types of the substituents. Furthermore, the compound expressed by the general formula (1) or the salt thereof of the present invention may exist in a form of hydrate or solvate. All of the compounds of general formula (1) in a form of free compound, salt, hydrate and solvate are included within a scope of the present invention.

The compound of the present invention expressed by the general formula (1) may have a single, or two or more asymmetric carbon atoms depending on types of the substituents. So that the compound may have optical isomers ascribable to a single or two or more asymmetric carbon atoms; or diastereomer ascribable to two or more asymmetric carbon atoms. All of arbitrary pure stereoisomer, arbitrary mixture of stereoisomers and racemic compound are included within a scope of the present invention.

Specific examples of the compounds of the present invention are listed hereinafter, while the present invention is by no means limited thereto.

1
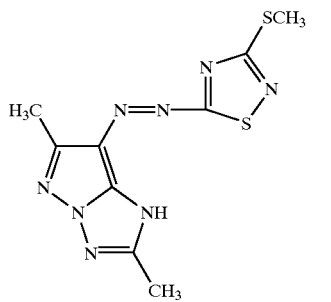
2
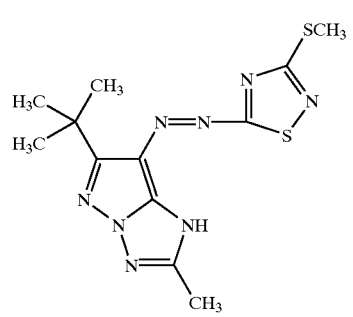
3
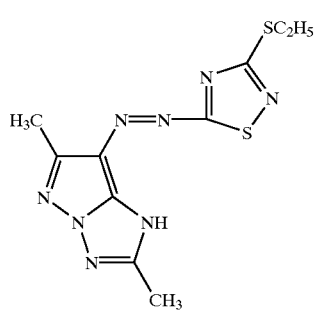
4
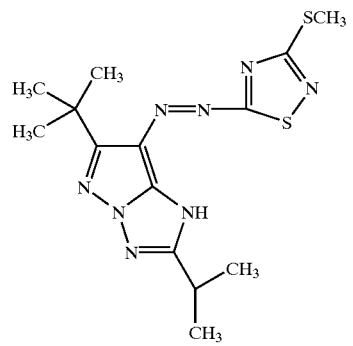
5
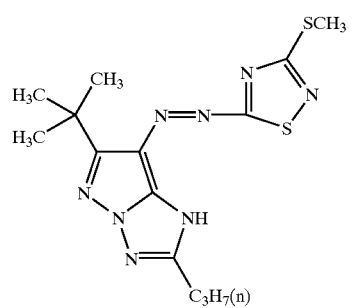
6
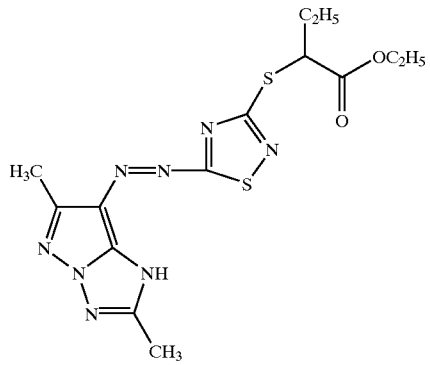
7
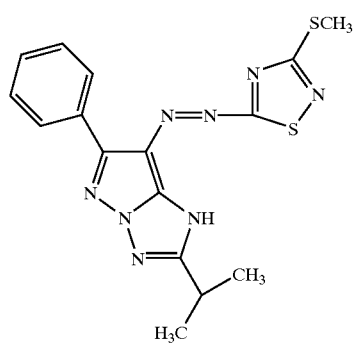
8
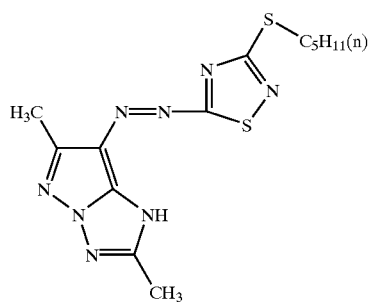
9
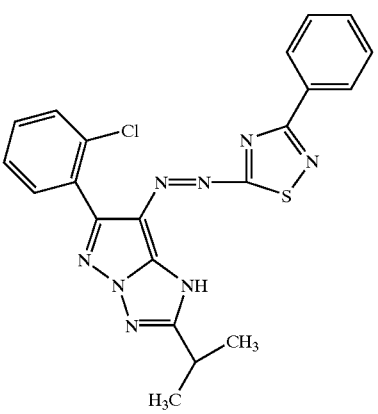

-continued
9
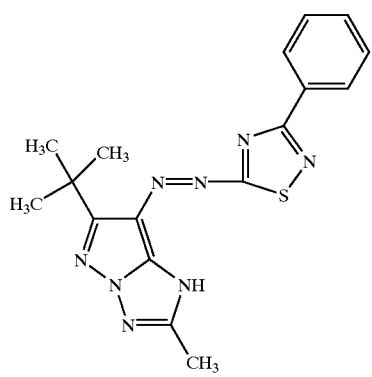
10
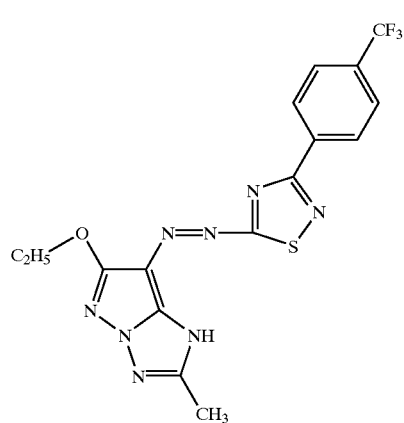
11
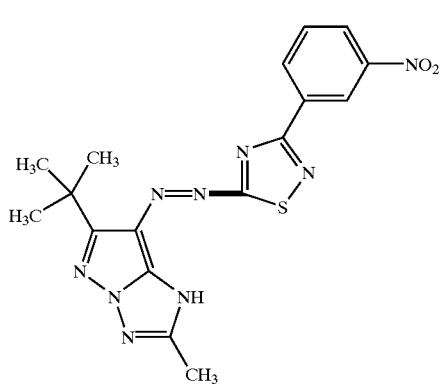
12
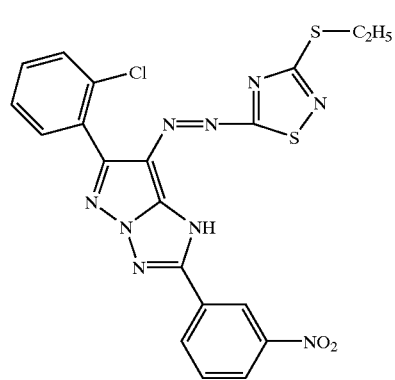
13
-continued
10
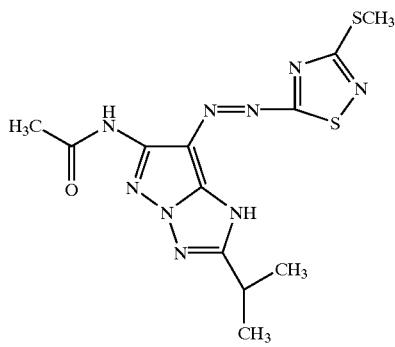
14
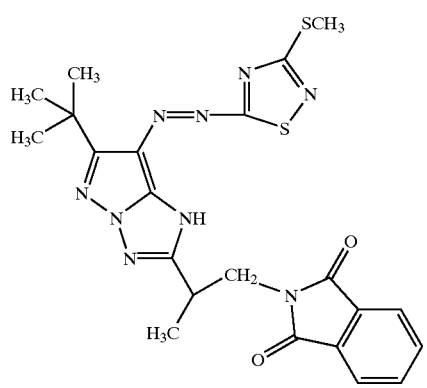
15
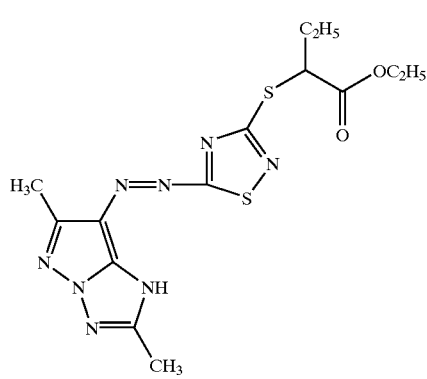
16
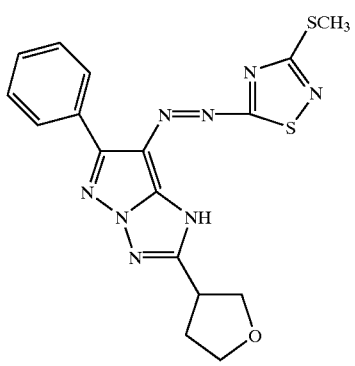
17

-continued
18
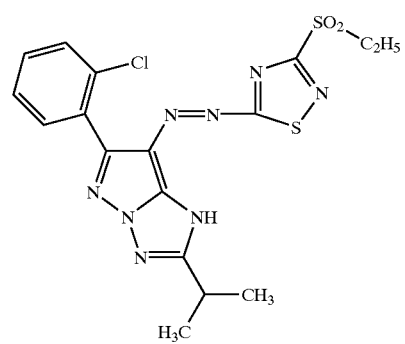
19
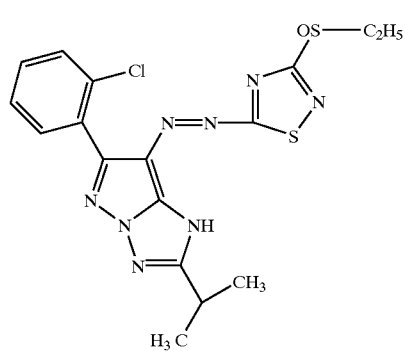
20
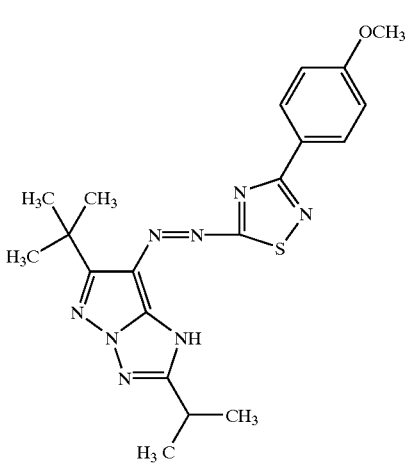
21
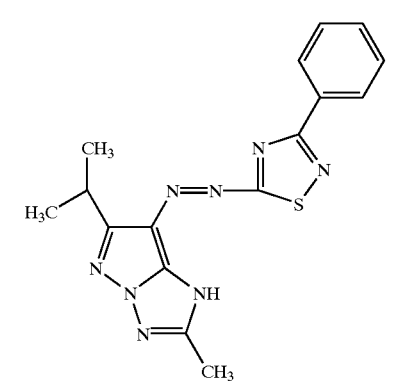
-continued
22
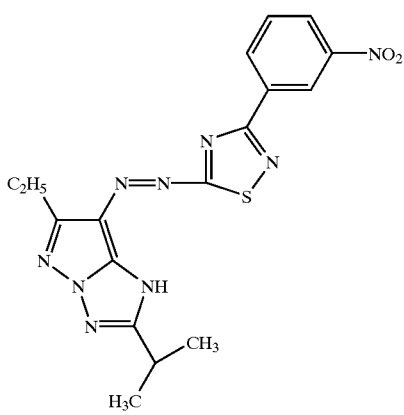
23
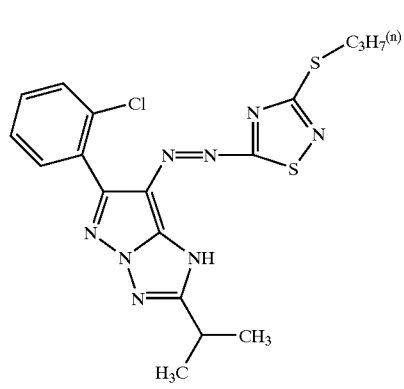
24
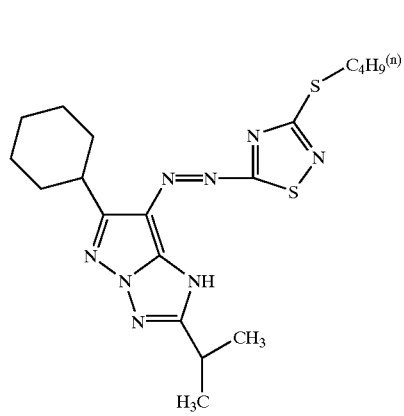
25
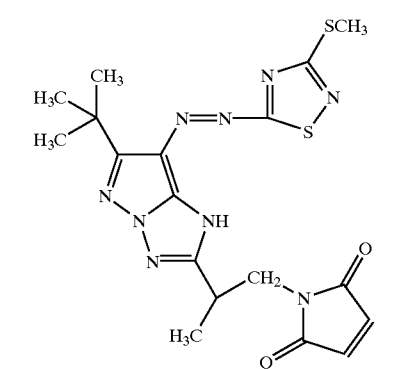

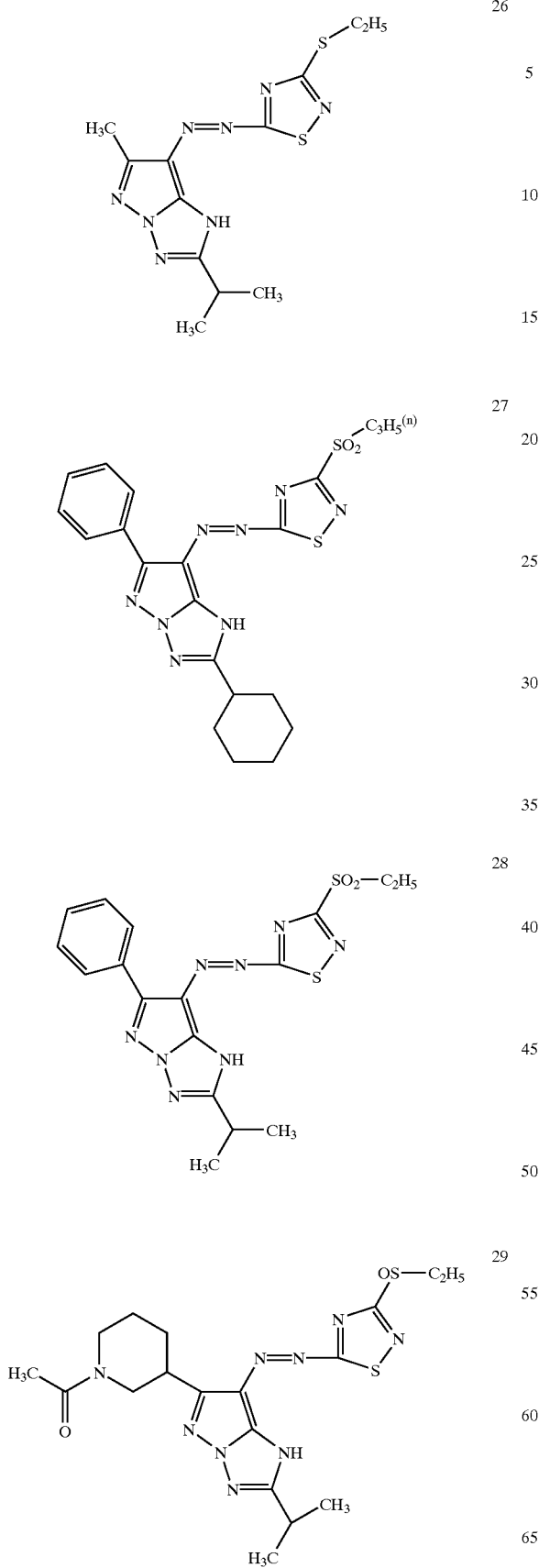

-continued
34
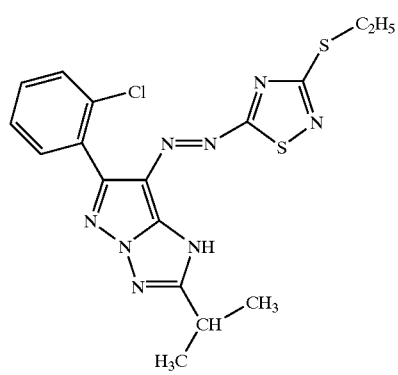
35
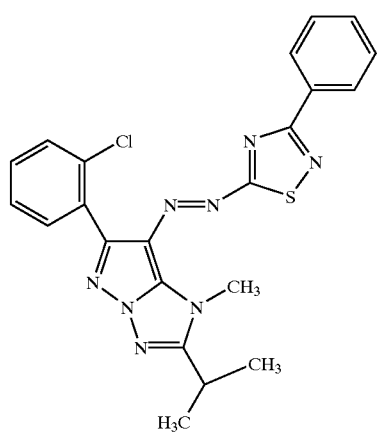
36
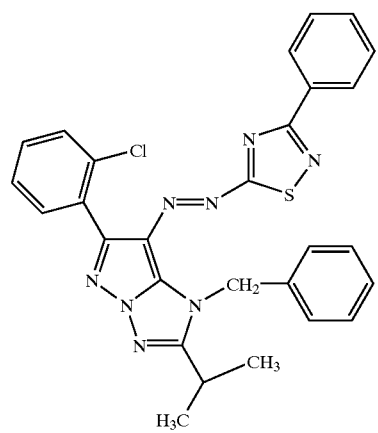
37
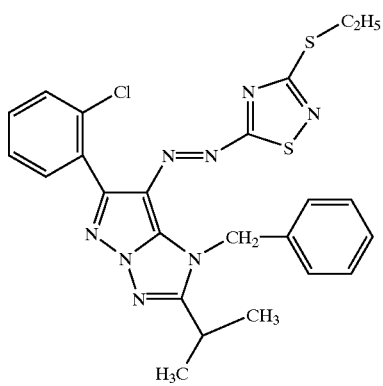
-continued
38
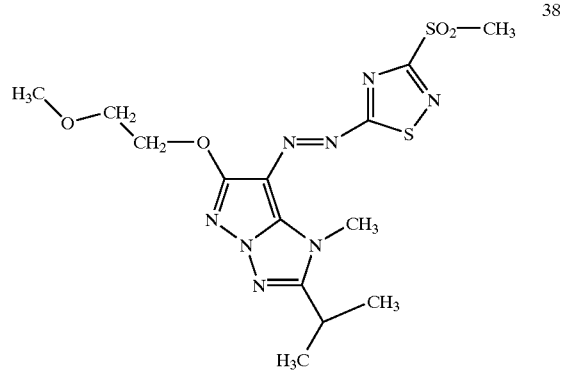
39
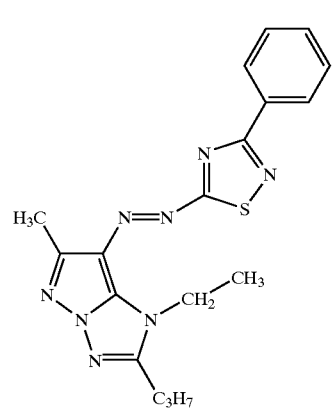
40
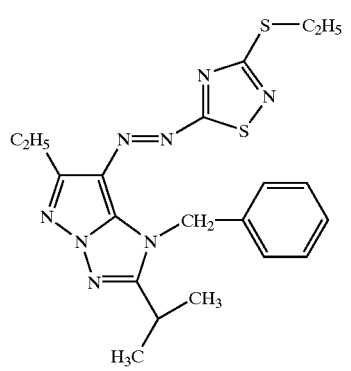
41
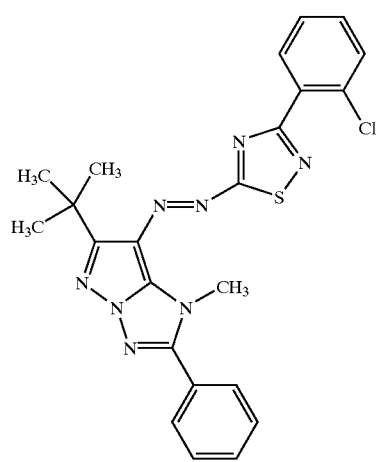

-continued

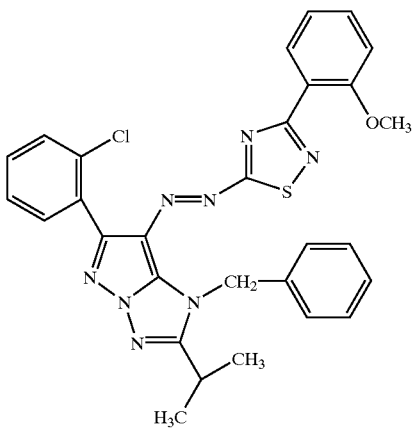

12

Next, a synthetic method of the compound of the present invention will be described. The compound of the present invention can be synthesized by azo coupling of Compound "A" (coupler) with Compound "B" (diazo component) as expressed by the reaction formula below:

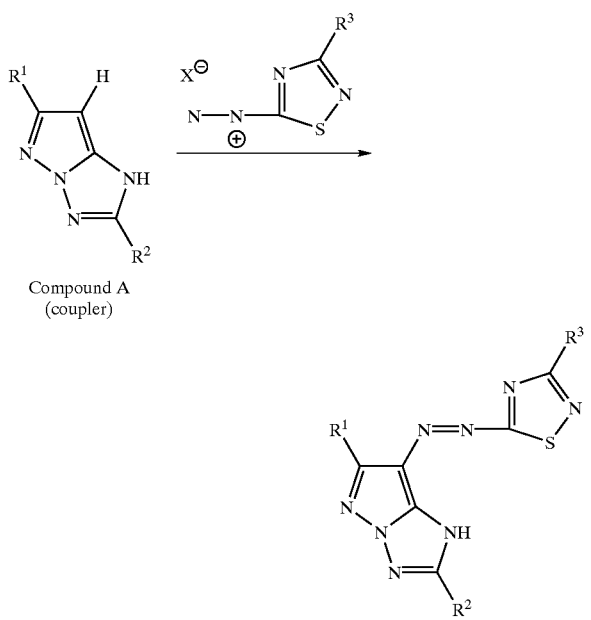

Compound "A" as a coupler can be synthesized by a variety of methods;, one of which being typically described in JP-A-1-275187, in which a 5-aminopyrazole compound and an imidate compound are reacted, then hydroxylamine is reacted therewith to obtain an amidoxime compound, which is then cyclodehydrated to generate the coupler Compound "A". On the other hand, Compound "B" as a diazo component can be synthesized as described, for example, in the same patent publication, in which 5-amine-1,2,4-thiadiol optionally having substituent $R^3$ at the 3-position is added at a low temperature to a mixture obtained by adding a sulfuric acid solution of sodium nitrite to a propionic acid/acetic acid mixed solution.

The azo coupling reaction between Compound "A" (coupler) and Compound "B" (diazo component) is also well known to those skilled in the art, in which Compound "A" and Compound "B" can be reacted in an arbitrary solvent and, in general, at a low temperature to proceed the coupling.

The compound of the present invention intended for use in the thermal transfer dye donating material preferably has a molecular weight of 500 or below from the viewpoint of thermal diffusivity, and more preferably 400 or below.

The compound of the present invention intended for use in a proton-dissociated form preferably has a low pea value. More specifically, the pKa in water/tetrahydrofuran =1:1 at 25° C. is preferably 8 or below, more preferably 7 or below, and still more preferably 5 or below.

The compound of the present invention, having such excellent properties as described above, has a wide variety of applications. For example, it can serve as a useful dye for various printers of thermal transfer system (e.g., direct digital thermal transfer system, sublimation system, and fused thermal transfer system), ink jet system and general printing system; and for filters (e.g., optical filter). Specific product forms thereof include ink sheet, dye donating material (e.g., thermal transfer dye donating material), ink composition (e.g., printing ink, and ink-jet ink), and photo-absorbing composition (e.g., color filter).

The ink sheet generally comprises a support (e.g., such that made of polyethylene terephthalate, polyamide or polycarbonate) and a layer provided thereon containing the compound of the present invention and a binder.

The dye donating material generally comprises a support (e.g. such that made of polyethylene terephthalate, polyamide, polycarbonate, glassine paper or conderser paper) and a layer provided thereon containing the compound of the present invention and a binder.

Ink composition generally comprises the compound of the present invention, a solvent [ink solvent such as phosphate ester-base solvent (e.g., tricresyl phosphate, trio-2-ethylhexyl phosphate, trioctyl phosphate), and phthalic ester-base solvent (e.g., dibutyl phthalate, and Vinycizer #124 produced by KAO Corporation), or the like], and an optional binder resin.

The filter generally consists of a polymer film containing the compound of the present invention, or consists of a support (made of, for example, polymer film or glass plate) and a photo-absorbing composition provided thereon containing the compound of the present invention and a binder.

The compound of the present invention can be contained in the dye donating layer provided on the support as described above so as to compose a thermal transfer dye donating material, and thus can be used for image production based on the thermal transfer system. The case employing a thermal transfer dye comprising the compound of the present invention for the image production based on the thermal transfer system will be detailed hereinafter. In general, a full color image production requires three dyes of yellow, magenta and cyan. The compound of the present invention does not release a proton under neutral to acidic conditions, so that employing the compound of the present invention as a yellow dye, and properly selecting the other two colors of dyes from those known in the art allows full color image production. The compound of the present invention dissociates to release a proton under basic condition, which results in shifting of the absorption peak to a longer wavelength and increase in the molecular absorption coefficient. The compound of the present invention may be used as mixed with a known dye. Moreover, two or more species of the compound of the present invention having the same color may be used in combination.

Next, a method for using a thermal transfer dye comprising the compound of the present invention will be described. The thermal transfer dye donating material can be used in a form of a sheet, continuous roll or ribbon.

In general, cyan dye, magenta dye, and yellow dye used in combination therewith, are respectively provided on a support so as to occupy independent zones. For example, a cyan dye zone, magenta dye zone and yellow dye zone can be arranged on a single support in a plane-sequential or line-sequential manner. It is also permissible to provide three separate thermal transfer dye donating materials respectively having the yellow dye, magenta dye and cyan. dye so as to heat-transfer these dyes one by one to a thermal transfer image accepting material. The dye compound of the present invention and any other dyes used as combined therewith may be coated on the support after being dissolved or dispersed in an appropriate solvent together with a binder, or may be printed on the support by a printing method such as gravure printing. It is generally preferable that the dye donating layer containing these dyes has a thickness of 0.2 to 5 μm as expressed in a dry film thickness, and more preferably 0.4 to 2 μm. The coated amount of the dye is preferably 0.03 to 1.0 g/m$^2$, and more preferably 0.1 to 0.6 g/m$^2$.

The binder used together with the foregoing dye can be any binder resin known for use for such purpose, and is selected from those exhibiting an excellent heat resistance and not preventing the dye transfer upon heating. Possible materials of the binder include vinyl resins such as polyamide resins, polyester resins, epoxy resins, polyurethane resins, polyacrylic resins (e.g., polymethyl methacrylate, polyacrylamide, and polystyrene-2-acrylonitrile) and polyvinylpyrolidone; polyvinylchloride resins (e.g., vinyl chloride-vinyl acetate copolymer); polycarbonate resins; polystyrene-polyphenylene oxide; cellulosic resins (e.g., methyl cellulose, ethyl cellulose, carboxymethyl cellulose, cellulose acetate hydrogen phthalate, cellulose acetate, cellulose acetate propionate, cellulose acetate butylate and cellulose triacetate); polyvinyl alcohol resins (e.g., polyvinyl alcohol, and partially-saponified polyvinyl alcohols such as polyvinyl acetal and polyvinyl butyral); petroleum-base resin; rosin derivatives; coumarone-indene resin; terpene resins; and polyolefin resins (e.g., polyethylene and polypropylene). In the present invention, such binder resin is preferably used in an amount of approx. 200 to 600 weight parts per 100 weight parts of the dye.

In the present invention, any known ink solvent may be available as an ink solvent for dissolving or dispersing the dye and the binder resin. Any known material maybe available as the support of the thermal transfer dye donating material, and examples of which include polyethylene terephthalate, polyamide, polycarbonate, glassine paper, condenser paper, cellulose ester, fluorine-containing polymer, polyether, polyacetal, polyolefin, polyimide, polyphenylenesulfide, polypropylene, polysulfone and cellophane. The thickness of the support for the thermal transfer. dye donating material is generally 2 to 30 μm.

It is also allowable to provide a slipping layer so as to prevent the dye donating material from sticking to a thermal head. The slipping layer can be composed of a lubricating material, containing or not containing a polymer binder, such as surfactant, solid lubricant, liquid lubricant or mixture thereof. The sticking preventive treatment is. preferably provided to the dye donating material on the plane thereof opposite to the dye donating layer so as to prevent such sticking due to heat from the thermal head which comes into contact with the back plane of the dye donating material, and so as to ensure good slipping property.

A hydrophilic barrier layer may optionally be provided to the dye donating material so as to prevent the dye from diffusing toward the support. The hydrophilic barrier layer contains a hydrophilic substance suitable for intended purposes.

The dye donating material may also be provided with an undercoat layer.

In the present invention, the thermal transfer dye donating material and the thermal transfer image accepting material are held in a stacked manner, supply thermal energy depending on the image information through a heating means such as a thermal head to the stack from either side, and preferably from the back side, thereby to allow the dye in the dye donating layer to transfer to the thermal transfer image accepting material depending on the quantity of the applied thermal energy. Thus can be obtained is a color image excellent in sharpness, resolution and gradation. also an anti-fading agent can be transferred in a similar manner. The heating means is not limited to the thermal head, and known available examples thereof include laser light (semiconductor laser light, for example), infrared flash and hot pen For the case of using the laser as the heat source, the thermal transfer dye donating material preferably contains a substance strongly absorbing such laser light. When such thermal transfer dye donating material is irradiated with the laser light, the absorptive material converts the light energy into heat energy to be conducted to the neighboring dye, and the dye is heated to a temperature capable of causing the dye transfer to the thermal transfer image accepting layer. The absorptive material can exist in a form of layer underlain the dye donating layer and/or in a form of being mixed with the dye. More detail on such process is described elsewhere in British Patent No. 2,083,726A. While several types of the laser may be applicable, semiconductor laser is particularly preferable in terms of its small size, low cost, stability, reliability, durability and easy modulation.

In the present invention, the thermal transfer dye donating material as combined with the thermal transfer image accepting material is applicable to printing using a variety of printers based on thermal printing system;) facsimile; printing of image obtained by magnetic recording system, magnetooptical recording system or optical recording system; and printing of image from television monitor or CRT monitor. Details on a method for the thermal transfer recording method can be referred to the description in JP-A-60-34895.

The thermal transfer image accepting material used as combined with the thermal transfer dye donating material of the present invention has on a support an accepting layer for accepting the dye coming by migration from the thermal transfer dye donating material. The image accepting layer is preferably a film containing, as a single species or in combination with other binder material, a substance capable of accepting and fixing the thermal transfer dye migrated from the thermal transfer dye donating material during the printing, and preferably has a thickness of 0.5 to 50 μm or around. Polymer is a representative material capable of accepting the thermal transfer dye, and examples of which include:

(a) those having ester bond (e.g., polyester resin);
(b) those having urethane bond (erg., polyurethane resin);
(c) those having amide bond (e.g., polyamide resin);
(d) those having urea bond (e.g., urea resin);
(e) those having sulfone bond (e.g., polysulfone resin); and
(f) those having other high-polarity bonds (e.g., polycaprolactone resin, styrene-maleic anhydride resin, polyvinyl chloride resin, and polyacrylonitrile resin).

In addition to the above synthetic resins, mixture or copolymer thereof are also available.

The thermal transfer image accepting material, in particular the image accepting layer, can contain an organic solvent with a high boiling point or heat-resistant solvent as a substance capable of accepting the thermal transfer dye or as a dispersion aid of the dye. A mordant or basic substance for mordanting the dye may also be included. Available basic substances include inorganic and organic basic substances. The inorganic basic substance is typified by a hydroxide or oxide of a metal. Preferable examples of the organic basic substance include nitrogen-containing heterocyclic compounds and amines, the latter of which being more preferable. The amines include primary amines (aniline, n-butylamine and octylamine), secondary amines (methylaniline, ethylaniline and dibutylamine), and tertiary amines (tributylamine and trioctylamine) The amines may be a polymer having in the partial structure thereof an amino group. Specific examples of the polymer having an amino group and mordant are disclosed in JP-A-1-188391, JP-A-3-03685 and JP-A-61-64492.

Specific examples of the mordant polymer include the following compounds:

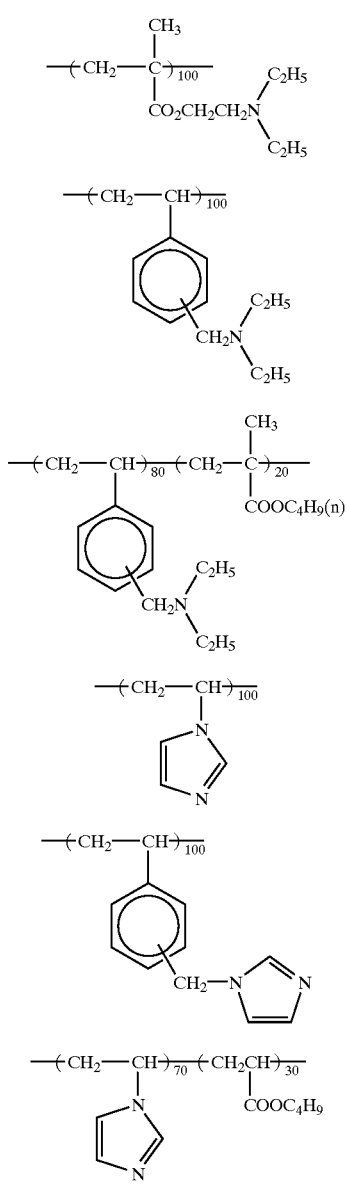

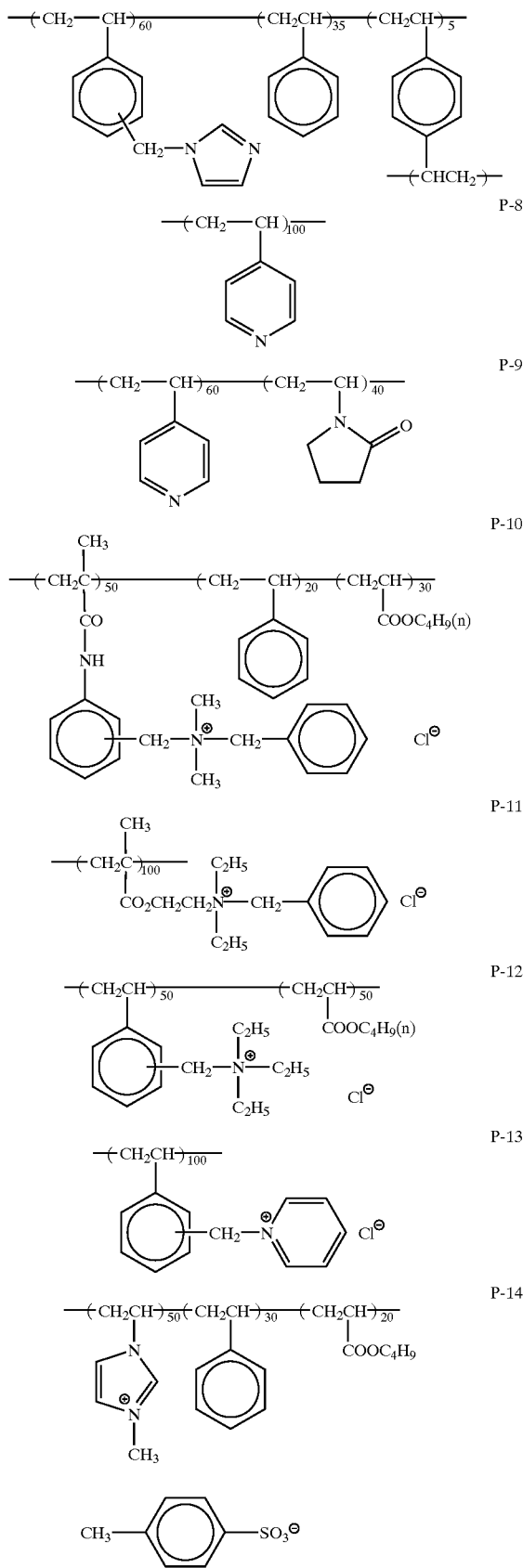

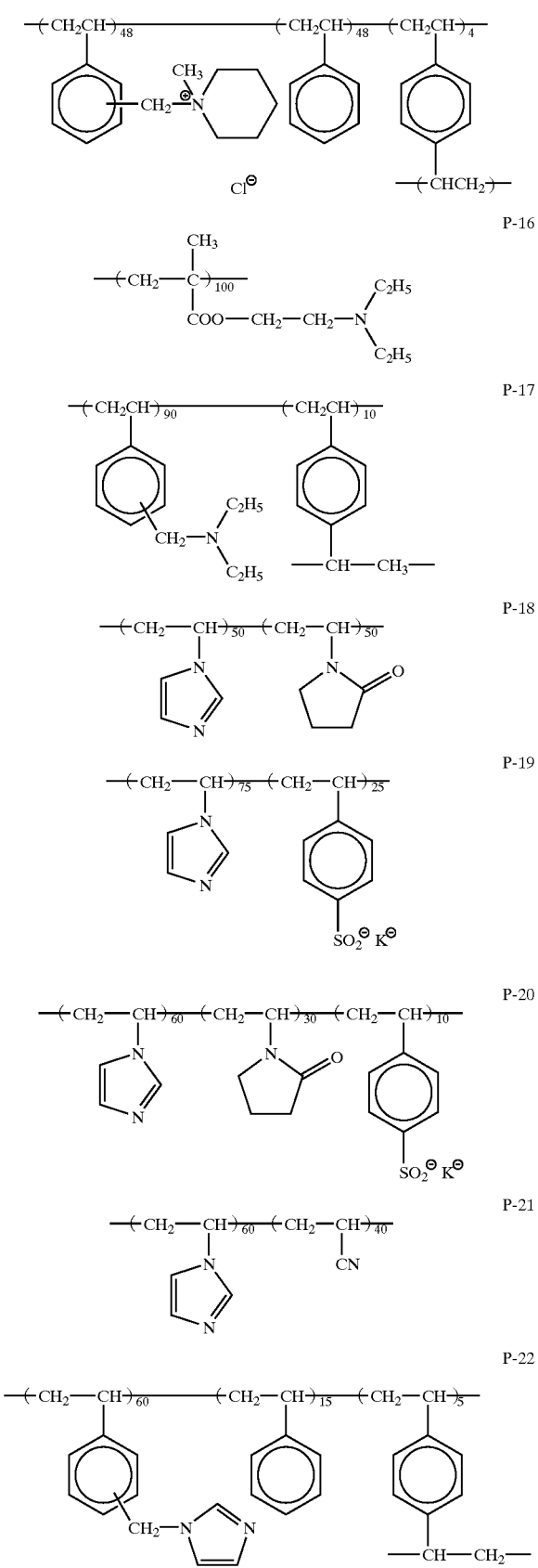

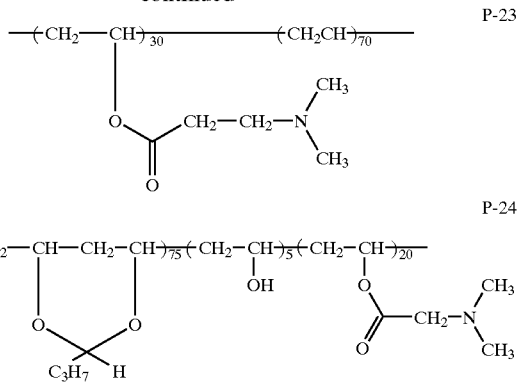

AEA (product of Sankyo Co., Ltd.) a polyvinyl acetal resin having an amino group, is a preferable example of the basic polymer. the image accepting layer of the thermal transfer image accepting material may be composed of the substance capable of accepting the thermal transfer dye, such substance being dispersed in a water-soluble binder. While various known water-soluble polymers can be used herein as such water-soluble binder, those having a group cross-linkable with a film hardening agent are desirable. The image accepting layer may be composed of two or more layers. In such a case, it is preferable that a layer closer to the support contains a synthetic resin with a low glass transition point, an organic solvent with a high boiling point or a heat-resistant solvent, so as to enhance the dyeing property with the dye; and that the outermost layer contains a synthetic resin with a higher glass transition point, and minimum amount or no high-boiling-point organic solvent nor heat-resistant solvent, so as to avoid failures such as sticking of the surface, adhesion to other members, re-transfer of the dye to other members after the transfer printing, and blocking with the thermal transfer dye donating material. The total thickness of the image accepting layer is preferably 0.5 to 50 μm, and more preferably 3 to 30 μm. For the case of a double-layered constitution, the thickness of the outermost layer is preferably 0.1 to 2 μm, and more preferably 0.2 to 1 μm.

The thermal transfer image accepting material may have an intermediate layer between the support and the image accepting layer. The intermediate layer refers to a layer having any one, or two or more functions of a cushion layer, porous layer and barrier layer against diffusion of the dye, and may sometimes plays a role of an adhesive.

The support of the thermal transfer image accepting material may be made of an arbitrary material provided that it is durable against the transfer temperature, and can satisfy demands for smoothness, whiteness, slipping property, antistatic property and dimple-proof property after the transfer printing.

A fluorescent brightener can be used for the thermal transfer image accepting material, in which using thereof in combination with an anti-fading agent being also allowable.

In the present invention, the outermost layer preferably contains a surface lubricant in any layer composing the thermal transfer dye donating material and/or the thermal transfer image accepting material, and more preferably in the outermost layer on which both materials come into contact, so as to improve the separating property between both materials.

The layers composing the thermal transfer dye donating material and the thermal transfer image accepting material. for use in the present invention may be hardened with a film hardener.

Examples of the film hardener include vinylsulfone-base film hardener (e.g., N,N'-ethylene-bis(vinylsulfonylacetamide)ethane), N-methylol-base film hardener (e.g., dimethylol urea) and polymer film hardener (e.g., compound disclosed in JP-A-62-234157).

The thermal transfer dye donating material or the thermal transfer image accepting material can contain an anti-fading agent. Examples of the anti-fading agent include antioxidant, ultraviolet absorber and a certain kind of metal complex. The anti-fading agent for preventing fading of the dye transferred into the image accepting material may preliminarily be contained in such image accepting material or may externally be supplied by a method such that transferring the agent from the dye donating material. The foregoing antioxidant, ultraviolet absorber and metal complex may be used in an arbitrary combination.

Layers composing the thermal transfer dye donating material or the thermal transfer image accepting material can contain a variety of surfactants as a coating aid, or for the purpose of improving the separation property, slipping property, antistatic property, and of accelerating the development. Layers composing the thermal transfer dye donating material or the thermal transfer image accepting material can also contain an organofluoro compound for the purpose of improving the slipping property, antistatic property, separation property or the like. Layers composing the thermal transfer dye donating material or the thermal transfer image accepting material can still also contain a matting agent.

The support for a dye fixing element (thermal transfer image accepting material) for use in the present invention can be made of a material durable against the process temperature. Such material is generally exemplified by paper and synthetic polymer (film), and more specifically by polyethylene terephthalate, polycarbonate, polyvinyl chloride, polystyrene, polypropylene, polyimide, celluloses (e.g., triacetyl cellulose) or any of these films containing pigment such as titanium oxide, synthetic paper made of polypropylene or the like produced by the filming process, mixed paper made of synthetic resin pulp such as of polyethylene and a natural pulp, Yankee paper, baryta paper, coated paper (in particular cast coated paper), metal, cloth and glass.

These materials may be used independently or as a support. having either plane or both planes of which laminated with synthetic polymer such as polyethylene.

Beside the above supports, those disclosed on pages 29 to 31 of JP-A-62-253159 may also be available.

These support may be coated on the surface thereof with an antistatic agent made. of semiconductor metal oxide such as alumina sol or stannic oxide, carbon black or the like together with a hydrophilic binder.

The above and other objects and features of the invention are apparent to those skilled in the art from the following preferred embodiments thereof when considered in conjunction with the accompanied drawing, in which:

FIG. 1 is a spectrum chart showing an absorption characteristic in ethyl acetate of Compound 9 of the present invention where optical density of the transmitted light through a cell having the light path length of 1 cm is 1.0. Wave lengths giving the maximum absorption (λmax) are 428 nm for Compound 9, 440 nm for Compound 18, 438 nm for Compound 31, 442 nm for Compound 32, 435 nm for Compound 33 and 434 nm for Compound 3.

EXAMPLES

The present invention will be described in further detail referring to Examples, where it is to be understood that the present invention is by no means limited to the Examples below.

Example 1

Synthesis of Compound 9

Compound "C" was synthesized from benzamidine and sodium thiocyanate. Compound "D" was synthesized according to a method described in 7P-A-1-275187.

Compound 9 was synthesized by the process shown below.

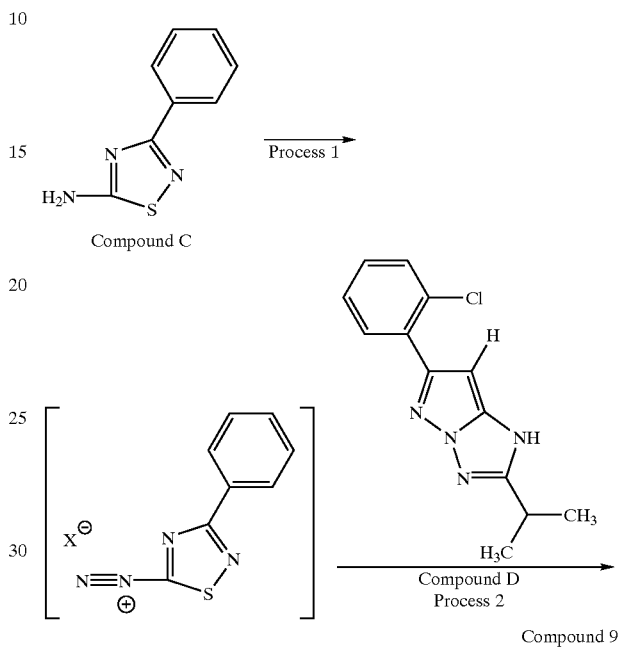

Sodium nitrite (0.72 g, 0.01 mol) was added to a concentrated sulfuric acid (5 ml), which was then heated to solubilize. The obtained solution was cooled to 25° C. or below, added with a mixed solution of propionic acid/acetic acid= 1 : 5 (10 ml), and then cooled with ice to 5° C. While keeping the temperature of the solution at 5° C., Compound "C" (1.63 g, 0.01 mol) was gradually added thereto, 10 g of mixed acid was further added, and the mixture was kept under stirring for 2 hours.

Compound "D" (2.61 g, 0.01 mol) was dissolved in a mixed solution of propionic acid/acetic acid=1 : 5 (30 ml) together with sodium acetate (6.8 g, 0.08 mol), and the obtained solution was then cooled to 5° C. on an ice bath. While keeping the temperature of the solution at 5° C., diazotated thiadiazole was gradually added thereto, the reaction mixture was kept under stirring overnight at the room temperature, diluted with water, and then filtered.

The recovered solid was recrystallized from ethanol and the deposited crystal was collected by filtration, thereby to obtain 2.51 g (5.6 mmol, yield=52%) of Compound 9.

An absorption characteristic of Compound 9 in ethyl acetate was shown in FIG. 1.

Example 2

Fabrication of Thermal Transfer Dye Donating Material

A polyethylene terephthalate film of 6 μm thick (product of Teijin, Ltd.), the rear surface of which having been subjected to heat-resistant smoothing finish, was used as a support, and a coating composition for forming a thermal transfer dye donating layer having a formulation shown below was coated by wire-bar coating on the front surface of the support so as to attain a dry thickness of 1.5 μm, thereby to fabricate a thermal transfer dye donating material (2-1).

Coating Composition for Forming Thermal Transfer Dye Donating Layer:

| | |
|---|---|
| Compound 5 (structure of which previously shown in this specification) | 10 mmol |
| polyvinyl butyral resin (Denka Butyral 5000-A, product of Denki Kagaku Kogyo K.K.) | 3 g |
| toluene | 40 ml |
| methyl ethyl ketone | 40 ml |
| polyisocyanate (Takenate D110N, product of Takeda Chemical Industries, Ltd.) | 0.2 ml |

Thermal transfer dye donating materials (2-2) to (2-19) were also fabricated similarly to the foregoing process except that using other compound listed in Table 1 in place of using Compound 5.

Structural formulae of Comparative Dye Compounds "a" to "d" are shown below:

Comparative Compound "a"

Compound 33 of JP-A-2-24191

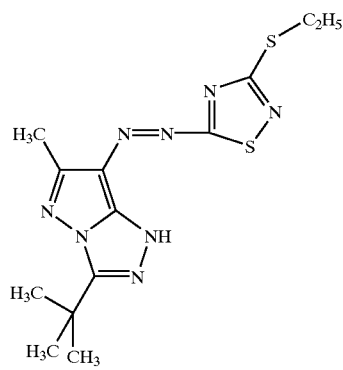

Comparative Compound "b"

Compound (26) of JP-A-1-275187

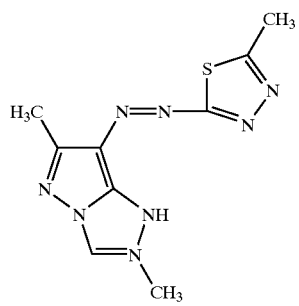

Comparative Compound "b"
Compound (41) of JP-A-1-275107

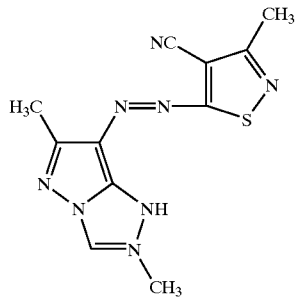

Comparative Compound "b"
Compound (23) of JP-A-1-275187

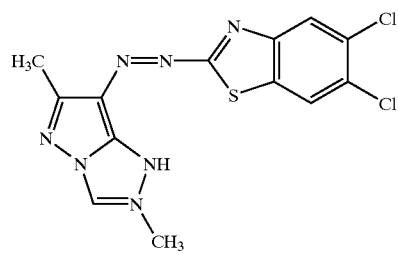

Fabrication of Thermal Transfer image Accepting Mateial

A synthetic paper of 150 μm thick (YUPO-FPG-150, product of Oji-Yuka Synthetic Paper Co., Ltd.) was used as a support, and a coating composition having a formulation shown below was coated thereon by wire-bar coating so as to attain a dry thickness of 8 μm, thereby to fabricate a thermal transfer image accepting material. The drying was effected by preliminary drying with a dryer, and the successive drying in an oven at 100° C. for 30 min. Coating Composition for Forming Thermal Transfer Image Accepting
Layer:

| | |
|---|---|
| polyester resin (Vylon-280, product of Toyobo Co., Ltd.) | 22 g |
| polyisocyanate (KP-90, product of Dainippon Ink and Chemicals, Inc.) | 4 g |
| amino-modified silicone oil (KF-857, product of Shin-Etsu Chemical Co., Ltd.) | 0.5 g |
| methyl ethyl ketone | 85 ml |
| toluene | 85 ml |
| cyclohexanon | 15 ml |

Thus obtained thermal transfer dye donating materials (2-1) to (2-19) were individually stacked with the thermal transfer image accepting material so that the dye donating layer of the former and the image accepting layer of the latter come into contact. Printing was then performed from the support side of the thermal transfer dye donating material using a thermal head with an output power of 0.25 W/dot, pulse width of 0.15 to 15 msec and dot density of 6 dot/mm, thereby to transfer the yellow to red dye and to form an image in the image accepting layer of the image accepting material. Using the compounds of the present invention resulted in image recording excellent in sharpness and free from non-uniform transfer. Individual materials were evaluated for the hue, maximum density and suitability in ink production.

Hue:
- ○ bright yellow hue,
- Δ slightly poor in yellow hue; and
- X poor in yellow hue.

Suitability in Ink Production:
- ○ coating composition for the thermal transfer dye donating layer has a good solubility;
- Δ time-consuming heating is necessary to dissolve the coating composition for the thermal transfer dye donating layer; and
- X incomplete solubilization of the coating composition for the thermal transfer dye donating layer having a undissolved portion of the dye crystal.

Next, the thermal transfer image accepting materials after such recording were irradiated with a Xe lamp (17,000 lux) for 3 days to evaluate the color fastness. More specifically, a portion showing a status-A reflection density of 1.0 before the irradiation was again measured for the status-A reflection density after the irradiation, which was expressed in a residual rate (in percent) to the pre-irradiation reflection density.

Results of the evaluation were summarized in Table 1.

TABLE 1

| Theremal transfer dye donating material | Compound | Hue | Maximum Density | Color Fastness | Suitability in ink production | Remarks |
|---|---|---|---|---|---|---|
| 2-1  | 5  | ○ | 2.1 | 91 | ○ | invention |
| 2-2  | 4  | ○ | 2.0 | 90 | ○ | " |
| 2-3  | 7  | ○ | 2.0 | 90 | ○ | " |
| 2-4  | 9  | ○ | 2.0 | 92 | ○ | " |
| 2-5  | 10 | ○ | 2.1 | 90 | ○ | " |
| 2-6  | 11 | ○ | 2.0 | 88 | ○ | " |
| 2-7  | 15 | ○ | 1.8 | 89 | ○ | " |
| 2-8  | 18 | ○ | 1.9 | 91 | ○ | " |
| 2-9  | 20 | ○ | 1.9 | 88 | ○ | " |
| 2-10 | 21 | ○ | 2.1 | 87 | ○ | " |
| 2-11 | 25 | ○ | 2.0 | 90 | ○ | " |
| 2-12 | 31 | ○ | 2.0 | 90 | ○ | " |
| 2-13 | 32 | ○ | 2.0 | 93 | ○ | " |
| 2-14 | 33 | ○ | 2.1 | 90 | ○ | " |
| 2-15 | 34 | ○ | 2.0 | 91 | ○ | " |
| 2-16 | a  | Δ | 1.5 | 89 | X | comparison |
| 2-17 | b  | ○ | 1.4 | 69 | X | " |
| 2-18 | c  | X | 1.0 | 81 | X | " |
| 2-19 | d  | X | 1.1 | 83 | X | " |

It was made clear that the compounds of the present invention can achieve excellent color fastness and high transfer density. These compounds were also found to afford bright hue and good suitability for ink production.

On the contrary, it was found that Comparative Compound "a" was inferior to the compounds of the present invention in terms of the hue and suitability for ink production. Comparative Compound "b" was poor in color fastness against light. Comparative Compounds "c" and "d" showed orange hue, indicating shift of the spectrum toward a longer wavelength region, poor suitability for ink production, poor surface property of the fabricated ink sheets and low transfer density.

The compounds of the present invention were more excellent in solubility and suitability for ink production, and cheaper in costs of the syntheses as compared with those for the Comparative Compounds. The compounds of the present invention were also found to be excellent in color fastness as measured in Wet heat test and dark heat test.

As is clear from the above, the compounds of the present invention can simultaneously achieve all properties of good hue, good transfer property and excellent color fastness against light, and were also excellent in suitability for ink production and costs.

Example 3

Fabrication of Thermal Transfer Image Accepting material (1)

A stacked synthetic paper of 150 μm thick was used as a support, and a coating composition (1) for forming an image accepting layer having a formulation shown below was coated by wire-bar coating on the surface of the support so as to attain a dry thickness of 5 μm, thereby to fabricate a thermal transfer image accepting material (1) (simply referred as to "image accepting material, hereinafter). The drying was effected by preliminary drying with a dryer, and the successive drying in an oven at 80° C. for 1 hour.

Coating Composition for Forming Image Accepting Layer (1):

| | |
|---|---|
| dye fixer P-24 | 15 g |
| binder resin | 25 g |
| (Denka Butyral 5000-A, product of Denki Kagaku Kogyo K.K.) | |
| methyl ethyl ketone | 100 ml |
| toluene | 50 ml |

Image accepting materials (2) to (4) were also fabricated similarly to the foregoing process except that individually using dye fixers and other binder resins listed in Table 2 in place of dye fixer P-24 and the binder for image accepting material (1).

TABLE 2

| Image accepting material | Dye fixer | Binder resin |
|---|---|---|
| (2) | P-3/15 g  | Denka Butyral 3000/25 g |
| (3) | P-22/15 g | Denka Butyral 3000/25 g |
| (4) | P-23/15 g | Denka Butyral 3000/25 g |
| (5) | P-24/40 g | — |

Comparative image accepting material (A) was also fabricated using a composition similar to that used for the image accepting material (2) of Example 3 except that containing no dye fixer.

Image transfer was then performed using the image accepting materials (1) to (5) and (A), and the thermal transfer dye donating materials (2-1) to (2-5) fabricated in Example 2. Result of the measurement of the image density were summarized in Table 3.

TABLE 3

| No. | Dye donating material | Compound | Image accepting material | Dye fixer | Density |
|---|---|---|---|---|---|
| 1 | 2-1 | 5 | (1) | P-24 | 2.3 |
| 2 | 2-2 | 6 | (2) | P-3  | 2.2 |

TABLE 3-continued

| No. | Dye donating material | Compound | Image accepting material | Dye fixer | Density |
|---|---|---|---|---|---|
| 3 | 2-3 | 12 | (3) | P-22 | 1.9 |
| 4 | 2-4 | 13 | (4) | P-23 | 2.0 |
| 5 | 2-5 | 20 | (5) | P-24 | 2.1 |
| 6 | 2-1 | 5 | (A) | none | 1.8 |

In Experiments 1 to 5, in which the dye fixer is contained in the image accepting layer, showed bright and dense yellow to red images. On the contrary, in Comparative Experiment 6, in which the dye fixer is not contained in the image accepting layer, only gave a yellow image with a low density, It was also found that images obtained in Experiments 1 to 5 did not blur even after forced heat test, while the image obtained in Experiment 6 resulted in a blurred image.

Example 4

An ink was produced using the compound of the present invention.

The composition having the formulation shown below was solubilized under stirring at 50° C. for 30 minutes, and then gradually ed to obtain an ink (4-1).

| tricrexyl phosphate | 20 ml |
|---|---|
| dibutyl phthalate | 20 ml |
| dimethyl formamide | 1 ml |
| Compound 1 of the invention | 0.5 mg |

Inks (4-2) to (4-12) were also produced similarly to the ink (4-1) except that using an equal weight of other compounds (listed in Table 4) in place of Compound 1.

Inks (4-1) to (4-12) were evaluated as in Example 2. It was found that the inks using the compounds of the present invention were excellent in the image density, hue and color fastness against light. Results of evaluating the hue and suitability for ink production were summarized in Table 4.

TABLE 4

| Ink No. | Compound | Hue | Suitability for ink production | Remarks |
|---|---|---|---|---|
| 4-1 | 1 | ○ | ○ | invention |
| 4-2 | 2 | ○ | ○ | invention |
| 4-3 | 3 | ○ | ○ | invention |
| 4-4 | 4 | ○ | ○ | invention |
| 4-5 | 5 | ○ | ○ | invention |
| 4-6 | 7 | ○ | ○ | invention |
| 4-7 | 9 | ○ | ○ | invention |
| 4-8 | 31 | ○ | ○ | invention |
| 4-9 | 32 | ○ | ○ | invention |
| 4-10 | 33 | ○ | ○ | invention |
| 4-11 | c | x | x | comparison |
| 4-12 | d | x | x | comparison |

Example 5

An ink sheet was fabricated using the compound of the present invention.

A transparent polyester-base polymer film of 150 μm thick was used as a support, and a coating composition (1) for forming an ink sheet having a formulation shown below was coated by wire-bar coating on the surface of the support so as to attain a dry thickness of 20 μm, thereby to fabricate an ink sheet (5-1). The drying was effected by preliminary drying with a dryer, and the successive drying in an oven at 100° C. for 30 minutes.

| polyester resin (Vylon-290, product of Toyobo Co., Ltd.) | 20 g |
|---|---|
| methyl ethyl ketone | 85 ml |
| toluene | 85 ml |
| cyclohexanone | 30 ml |
| Compound 1 of the invention | 0.5 mg |

Ink sheets (5-1) to (5-12) were also produced similarly to the ink sheet (5-1) except that using an equal weight of other compounds (listed in Table 5) in place of Compound 1. The ink sheets (5-1) to (5-12) were then evaluated as in Example 2. It was found that the ink sheets using the compounds of the present invention were excellent in the image density, hue and color fastness against light. Results of evaluating the hue and suitability for ink production (evaluated as described in Example 2) were summarized in Table 5.

TABLE 5

| Ink No. | Compound | Hue | Suitability for ink production | Remarks |
|---|---|---|---|---|
| 5-1 | 1 | ○ | ○ | invention |
| 5-2 | 2 | ○ | ○ | invention |
| 5-3 | 3 | ○ | ○ | invention |
| 5-4 | 4 | ○ | ○ | invention |
| 5-5 | 5 | ○ | ○ | invention |
| 5-6 | 7 | ○ | ○ | invention |
| 5-7 | 9 | ○ | ○ | invention |
| 5-8 | 31 | ○ | ○ | invention |
| 5-9 | 32 | ○ | ○ | invention |
| 5-10 | 33 | ○ | ○ | invention |
| 5-11 | c | x | x | comparison |
| 5-12 | d | x | x | comparison |

A filter was fabricated using the compound of the present invention.

A glass plate of 3 mm thick was used as a support, and a coating composition having a formulation shown below was coated by spin coating on the surface of the support so as to attain a dry thickness of 10 μm, thereby to fabricate a filter (6-1). The filter was preliminarily dried with a dryer, and was then allowed to stand at the room temperature for 2 days for thorough drying.

2,2,3,3-tetrafluoro-1-propanol 17 mg

Compound 1 of the invention 0.5 mg

Filters (6-1) to (6-12) were also fabricated similarly to the filter (6-1) except that using an equal weight of other compounds (listed in Table 6) in place of Compound 1. The filters (6-1) to (6-12) were then evaluated for the hue (as in Example 2) and the surface property. It was found that the filters using the compounds of the present invention were excellent in the hue and surface property.

Surface Property of the Filter.

○ no crystal nor agglomeration of the dye observed under microscope;

Δ a slight crystal or agglomeration of the dye observed under microscope, while being not visible in visual inspection; and X crystal or agglomeration of the dye observed in visual inspection.

Results of evaluating the filters were summarized in Table 6.

TABLE 6

| Filter No. | Compound | Hue | Surface property of filter | Remarks |
|---|---|---|---|---|
| 6-1 | 1 | ○ | ○ | invention |
| 6-2 | 2 | ○ | ○ | invention |
| 6-3 | 3 | ○ | ○ | invention |
| 6-4 | 4 | ○ | ○ | invention |
| 6-5 | 5 | ○ | ○ | invention |
| 6-6 | 7 | ○ | ○ | invention |
| 6-7 | 9 | ○ | ○ | invention |
| 6-8 | 31 | ○ | ○ | invention |
| 6-9 | 32 | ○ | ○ | invention |
| 6-10 | 33 | ○ | ○ | invention |
| 6-11 | c | x | x | comparison |
| 6-12 | d | x | x | comparison |

What is claimed is:

1. A dye compound expressed by the general formula (1):

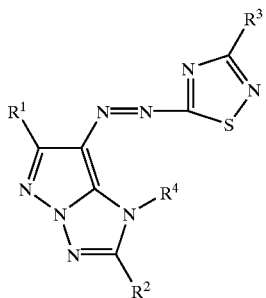

or a salt thereof, wherein $R^1$, $R^2$, $R^3$ and $R^4$ independently represent a hydrogen atom or a substituent.

2. The dye compound as claimed in claim 1, wherein $R^1$, $R^2$, $R^3$ and $R^4$ of the general formula (1) are independently any of the substituents selected from the group consisting of hydrogen atom, halogen atom, aliphatic group, aryl group, heterocyclic group, cyano group, hydroxyl group, nitro group, carboxyl group, alkoxy group, aryloxy group, silyloxy group, heterocyclic oxy group, acyloxy group, carbamoyloxy group, alkoxycarbonyloxy group, aryloxycarbonyloxy group, amino group, acylamino group, aminocarbonylamino group, alkoxycarbonylamino group, aryloxycarbonylamino group, sulfamoylamino group, alkyl and arylsulfonylamino groups, alkylthio group, arylthio group, heterocyclic thio group, sulfamoyl group, sulfo group, alkyl and arylsulfinyl groups, alkyl and arylsulfenyl groups, alkyl and arylsulfonyl groups, acyl group, aryloxycarbonyl group, alkoxycarbonyl group, carbamoyl group, azo group, imide group and phosphoryl group.

3. The dye compound as claimed in claim 1, wherein $R^1$ of the general formula (1) is selected from the group consisting of alkyl group, aryl group, acylamino group, heterocyclic group and alkoxy group: $R^2$ is either of alkyl group or aryl group; $R^3$ is selected from the group consisting of hydrogen atom, halogen atom, cyano group, aliphatic group, alkylthio group, alkylsulfonyl group, alkylsulfinyl group, alkoxycarbonyl group, carbamoyl group, alkoxy group, arylthio group, arylsulfonyl group, arylsulfinyl group, aryloxy group and aryl group; and $R^4$ is selected from the group consisting of hydrogen atom, aliphatic group or aryl group.

4. A filter containing the compound or the salt thereof as claimed in claim 1.

5. An ink sheet containing the compound or the salt thereof as claimed in claim 1.

6. A thermal transfer dye donating material containing the compound or the salt thereof as claimed in claim 1.

7. An ink composition containing the compound or the salt thereof as claimed in claim 1.

8. The dye compound as claimed in claim 2, wherein the amino group is a substituted or unsubstituted alkylamino group or a substituted or unsubstituted anilino group.

* * * * *